US008369617B2

(12) United States Patent
Bamidele et al.

(10) Patent No.: US 8,369,617 B2
(45) Date of Patent: Feb. 5, 2013

(54) CROSS DEVICE IMAGE RECOGNITION IMPROVEMENT

(75) Inventors: Adetokunbo Bamidele, Ipswich (GB);
Christophe Marle, San Francisco, CA (US); Matthias Jacob, San Francisco, CA (US); Jiang Gao, Cupertino, CA (US); Philipp Schloter, San Francisco, CA (US)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 12/758,297

(22) Filed: Apr. 12, 2010
(Under 37 CFR 1.47)

(65) Prior Publication Data
US 2011/0249893 A1 Oct. 13, 2011

(51) Int. Cl.
*G06K 9/00* (2006.01)
(52) U.S. Cl. ...................................................... 382/165
(58) Field of Classification Search .................. 382/100, 382/103, 110–111, 115, 141, 144–147, 154, 382/164–165, 168, 170, 173, 181, 190, 192, 382/194, 199, 209, 217–222, 224, 228, 276, 382/306, 312; 340/933, 937; 348/135, 169; 396/153
See application file for complete search history.

(56) References Cited

U.S. PATENT DOCUMENTS

| 5,063,603 | A | * | 11/1991 | Burt | 382/115 |
| 5,546,475 | A | * | 8/1996 | Bolle et al. | 382/190 |
| 6,763,125 | B2 | * | 7/2004 | Ohta | 382/104 |
| 7,148,913 | B2 | * | 12/2006 | Keaton et al. | 348/169 |
| 7,804,980 | B2 | * | 9/2010 | Sasaki | 382/103 |

OTHER PUBLICATIONS

U.S. Appl. No. 12/459,081, filed Jun. 26, 2009.

* cited by examiner

*Primary Examiner* — Jose Couso
(74) *Attorney, Agent, or Firm* — Harrington & Smith

(57) ABSTRACT

A method includes modifying values of image data of a first image of an object, the first image taken by a user using a user equipment. The modifying is performed to map one or more color characteristics of one or more color components of the user equipment to corresponding one or more color characteristics for the one or more color components of a reference device. The modifying creates a modified image. On the user equipment, comparisons are performed between the modified image and a number of second images of objects taken by the reference device. Apparatus and program products are also disclosed. Additionally, a user interface is disclosed that provides for training a device model that is used during the mapping.

20 Claims, 9 Drawing Sheets

US 8,369,617 B2

CROSS DEVICE IMAGE RECOGNITION IMPROVEMENT

TECHNICAL FIELD

This invention relates generally to image capture and, more specifically, relates to image matching using different devices.

BACKGROUND

In a visual search, a user points a camera of a device such as a phone at an object and has the phone recognize the object using an image captured by the camera. Once the object is recognized, the phone can take a multitude of actions. For example, the object might be a building, and the phone could present the user with additional information such as the name, address, occupants, or architecture of the building, or search results, e.g., from the Internet, pertaining to the building. Illustratively, the results could be of restaurants in or near the building. As another example, the object could be a poster for a movie and the phone could present information about the movie, a trailer for the movie, local theaters showing the movie, and the like. As yet another example, the object could be a barcode for a product, and the phone could return a detailed description of the product, nearby stores having the product, and the prices of the product at those stores.

In order to recognize an object, the phone can access a visual search database, typically on the phone. The visual search database may also be at a remote server. The images in the visual search database are commonly called tags. These images are either captured with a dedicated device by a professional service team, or are provided by multiple sources using a variety of cameras/devices.

For image matching, the captured image is saved in the memory. Then this input image is matched against the images in the visual search database. Typically, the phone will present multiple possible matches to a user for confirmation as to which of the images (if any) is a match to the object the user captured with his or her image. When an object in a presented image matches the object in the user-taken image, information associated with the object will be displayed. Typically, the visual search database contains images of all possible objects the user may need to recognize.

This type of visual search has many benefits, but could be improved.

SUMMARY

In an exemplary embodiment, a method includes modifying values of image data of a first image of an object, the first image taken by a user using a user equipment. The modifying is performed to map one or more color characteristics of one or more color components of the user equipment to corresponding one or more color characteristics for the one or more color components of a reference device. The modifying creates a modified image. On the user equipment, comparisons are performed between the modified image and a number of second images of objects taken by the reference device.

In another exemplary embodiment, an apparatus is disclosed that includes one or more processors configured to cause the apparatus to perform at least modifying values of image data of a first image of an object, the first image taken by a user using the apparatus. The modifying is performed to map one or more color characteristics of one or more color components of the apparatus to corresponding one or more color characteristics for one or more color components of a reference device. The modifying creates a modified image. The one or more processors are configured to cause the apparatus to perform performing comparisons between the modified image and a number of second images of objects taken by the reference device.

In an additional exemplary embodiment, a computer program product is disclosed that includes a computer-readable storage medium bearing computer program code embodied therein for use with an apparatus. The computer program code includes code for modifying values of image data of a first image of an object, the first image taken by a user using the apparatus. The modifying is performed to map one or more color characteristics of one or more color components of the apparatus to corresponding one or more color characteristics for the one or more color components of a reference device. The modifying creates a modified image. The code also includes code for performing comparisons between the modified image and a number of second images of objects taken by the reference device.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF THE DRAWINGS

As stated above, visual search has many benefits but could be improved. In particular, the images (commonly called "tags") in the visual search database may be captured by multiple devices, and it is likely the device used for recognition is not the same device used for capturing the tags. A frequent problem is that because the images are captured by different devices, the accuracy of search results will deteriorate. The mismatch of images coming from different devices accounts for a large portion of total mismatches, and is one of the main factors in the overall accuracy of the visual search system. The images provided by different devices are more difficult to match, because, e.g., the differences in sensor characteristics between devices and the differences in the internal image processing pipeline in each device. The internal image pipeline processes the raw images in different ways, before generating the processed images that are then stored. Image feature mismatch is different depending on devices. There is no single image processing pipeline that can compensate for all the different devices.

These issues reduce the image recognition accuracy and have a strong influence on the user experience using a mobile visual search system. Existing attempts at correcting these problems include using dedicated tags for more reliable recognition. This approach uses the same device for tagging and recognition, but a drawback is the process is not scalable. This is particularly true considering there are a wide variety of cameras/devices to support, which would require a very large database. Another attempt includes attempting to create single generic image matching algorithm that covers all devices with optimal performance. However, such algorithms have previously not been successful. Further, there is no training option on devices, meaning that there previously was no way to compensate image processing for individual devices.

This invention addresses these issues by using, in certain exemplary embodiments, device-dependent white balance, adaptive dynamic range adjustment across devices, and on-device interface design. The dynamic range adjustment affects saturation. The term "adaptive" means the adjustment also depends on which segment (e.g., range) of a histogram a pixel intensity level falls in, and the adjustment therefore may have influence on contrast. This invention greatly improves the image recognition accuracy across devices. It also provides a mechanism for users to enable an image processing algorithm on their devices.

Figure 1A:
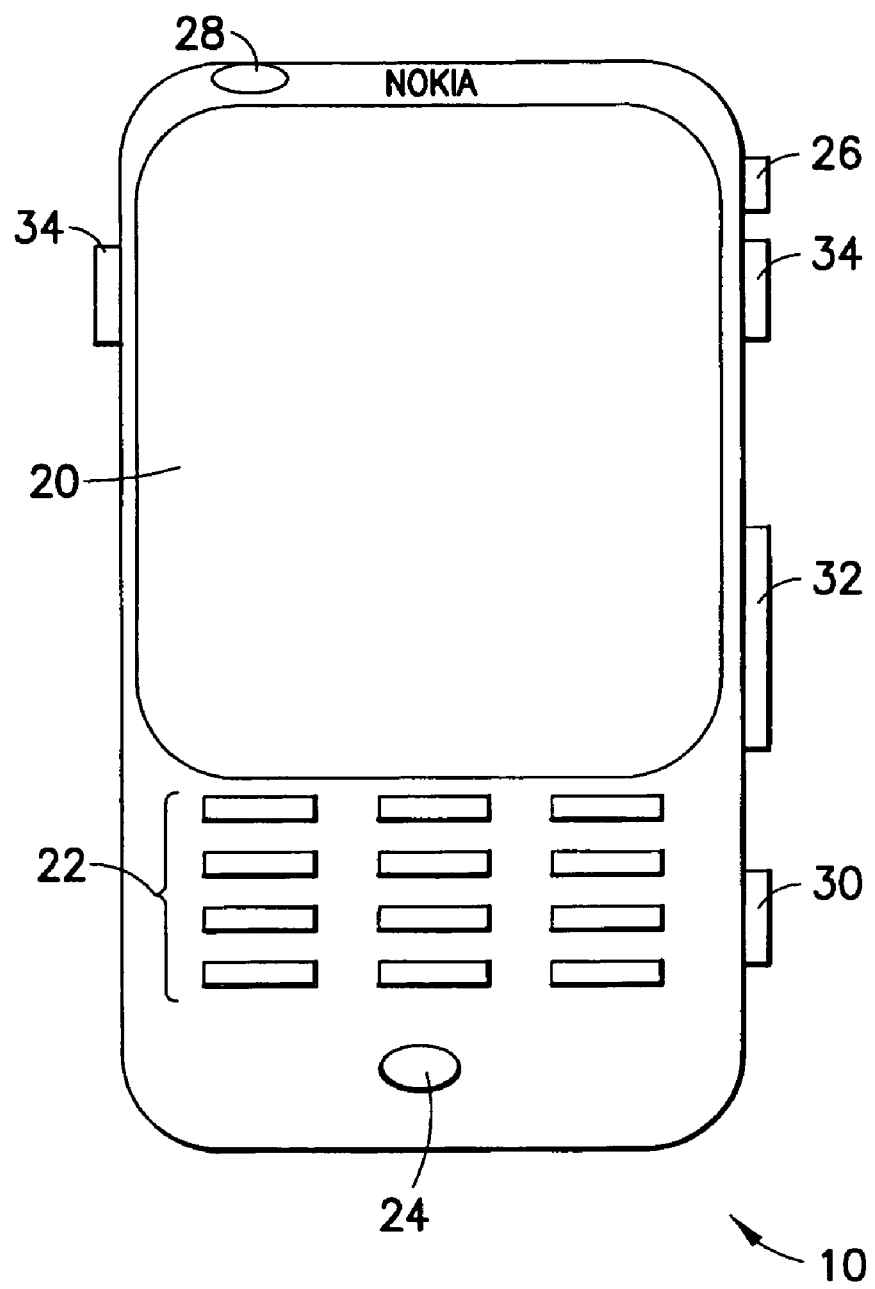
FIG. 1A shows a simplified block diagram of an exemplary user equipment suitable for use in practicing the exemplary embodiments of this invention.
Figure 1B:
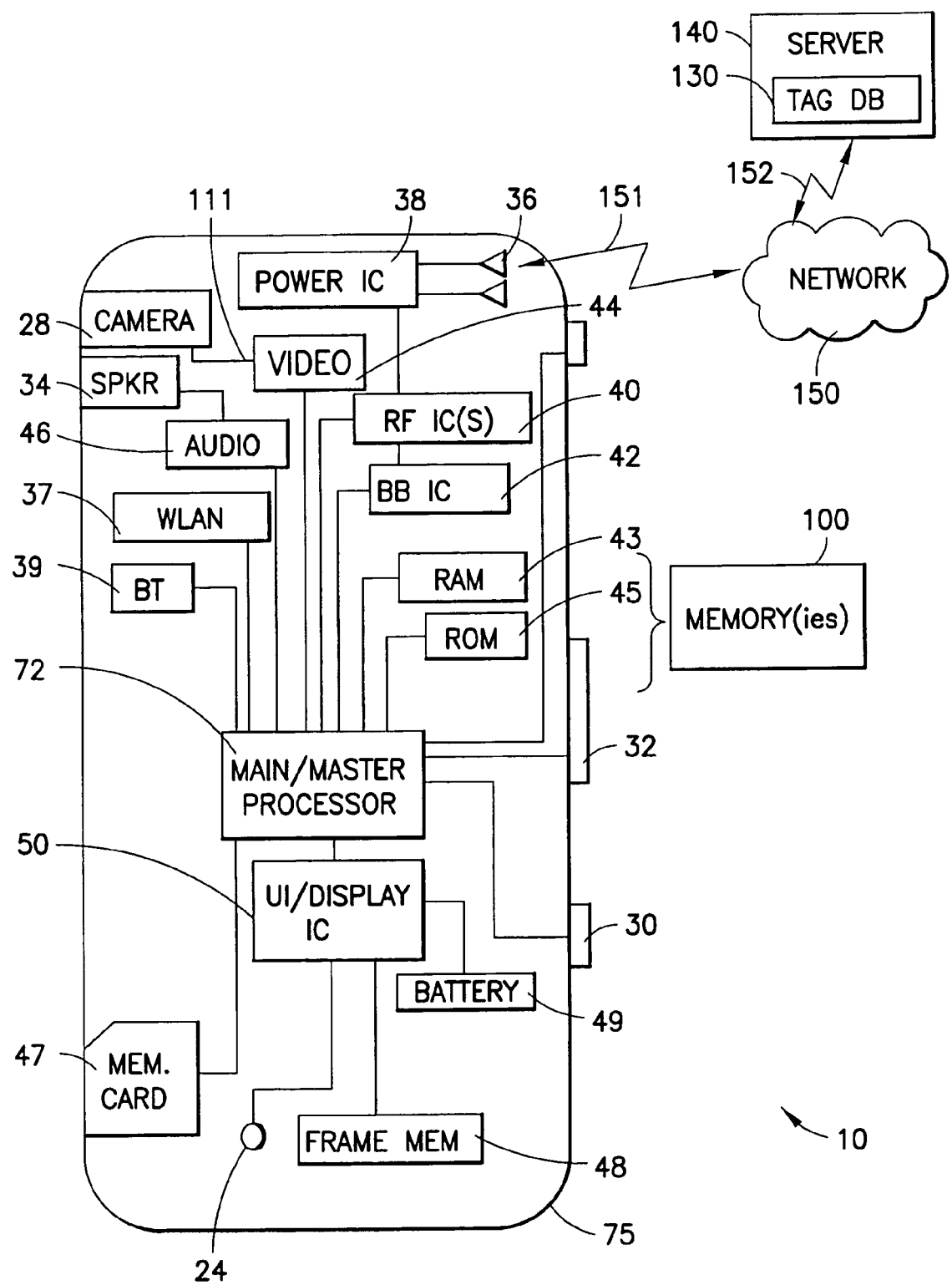
FIG. 1B shows a more particularized block diagram of a user equipment such as that shown at FIG. 1A.
Figure 1C:
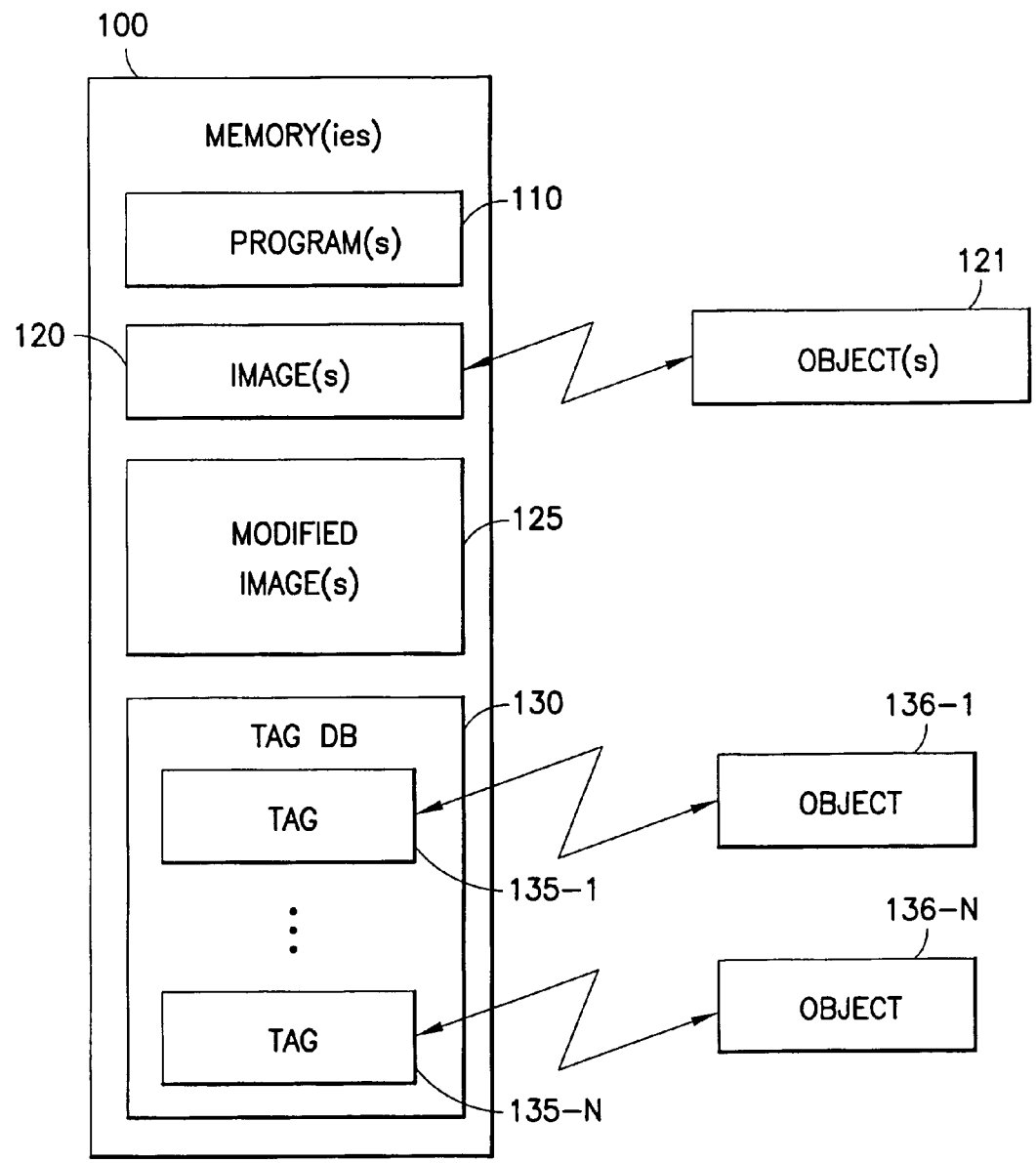
FIG. 1C shows a more particularized block diagram of a memory or memories shown also in FIG. 1B.

Before proceeding with additional description of the invention, attention is first directed to an exemplary user equipment 10 that is suitable for carrying out exemplary embodiments of the invention. FIG. 1, including FIG. 1A and FIG. 1B and FIG. 1C, illustrates detail of an exemplary user equipment 10 in both plan view (FIG. 1A) and sectional view (FIG. 1B), and a more detailed section view of a memory or memories (FIG. 1C). It is noted that the user equipment 10 may also be referred to as a mobile device or a device herein. The invention may be embodied in one or some combination of the function specific components shown in FIG. 1. At FIG. 1A, the user equipment 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user. The exemplary UE 10 has a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker (s) 34 when the camera 28 is not in an active mode.

Within the sectional views of FIGS. 1B and 1C are seen the multiple transmit antennas and possibly also multiple receive antennas 36 that are typically used for radio frequency (e.g., cellular) communication. The antennas 36 may be multi-band for use with other radios in the user equipment 10. The operable ground plane for the antennas 36 spans, in an exemplary embodiment, the entire space enclosed by the housing 75 though in some embodiments the ground plane may be limited to a smaller area, such as disposed on a printed wiring board on which the power integrated circuit 38 is formed. The power integrated circuit 38 controls power amplification on the channels being transmitted and/or across the antennas 36 that transmit simultaneously where spatial diversity is used, and amplifies the received signals. The power integrated circuit 38 outputs the amplified received signal to the radio frequency (RF) integrated circuit 40 which demodulates and downconverts the signal for baseband processing. The baseband (BB) integrated circuit 42 detects the signal which is then converted to a bit stream and finally decoded. Similar processing occurs in reverse for signals generated in the user equipment 10 and transmitted from it.

Those signals that go to and from the camera 28 pass through an image/video processor 44 (e.g., part of an image pipeline) that processes the image frames 111 (stored as images 120 after processing). A separate audio processor 46 may also be present controlling signals to and from the speakers 34 and the microphone 24. The graphical display interface 20 is refreshed from a frame memory 48 as controlled by a user interface integrated circuit 50, which may process signals to and from the display interface 20 and/or additionally process user inputs from the keypad 22 and elsewhere.

Certain embodiments of the user equipment 10 may also include one or more secondary radios such as a wireless local area network (WLAN) radio 37 and a BLUETOOTH (BT) radio 39, which may incorporate an antenna on the integrated circuit or be coupled to an antenna off the integrated circuit. As is known, BLUETOOTH is a wireless protocol for exchanging data over short distances. Throughout the user equipment 10 are various memory/memories 100 such as random access memory (RAM) 43, read only memory (ROM) 45, and in some embodiments removable memory such as the illustrated memory card 47. On the memories 100, various programs 110 may be stored. The programs 110 include, e.g., an operating system and a program for carrying out the exemplary operations described herein. All of these components within the user equipment 10 are normally powered by a portable power supply such as a battery 49.

If the integrated circuits 38, 40, 42, 44, 46, 50 are embodied as separate entities in a user equipment 10, these may operate in a slave relationship to the main processor 72 (also an integrated circuit), which may then be in a master relationship to them. Embodiments of this invention may be disposed across various integrated circuits and memories as shown, or disposed within another processor that combines some of the functions described above for FIGS. 1B and 1C. Any or all of these various processors of FIG. 1B access one or more of the various memories of FIGS. 1B and 1C, which may be on integrated circuit with the processor or separate from the processor.

Note that the various processors (e.g., 38, 40, 42, 44, 46, 50, 72) that were described above may be combined into a fewer number than described and, in a most compact case, may all be embodied physically within a single integrated circuit. An integrated circuit, as is known, is an electronic circuit built on a semiconductor (or insulator) substrate, usually one of single-crystal silicon. The integrated circuit, often called a chip, may be packaged in a hermetically sealed case or a non-hermetically sealed plastic capsule, with leads extending from it for input, output, and power-supply connections, and for other connections that may be necessary when the device is put to use. It is also noted that any of the processors (e.g., 38, 40, 42, 44, 46, 50, 72) may also include other circuitry, such as discrete circuitry, and may include such circuitry as programmable logic devices and gate arrays. The program(s) 110 may therefore be implemented as hardware elements, or as software that executes on one or more of the processors (e.g., 38, 40, 42, 44, 46, 50, 72), or as some combination of hardware elements and software.

In the example of FIG. 1, the image(s) 120 are image frames 111 taken by camera 28 and after processing by image/video processor 44. The image(s) 120 may or may not be stored in a compressed form. The image(s) 120 are of a corresponding object(s) 121 and are to be compared with the tags 135-1 through 135-N in the tag database (DB) 130. For clarity, the images in the database 130 are called tags herein, to distinguish the images in the database 130 from images taken by the user of user equipment 10. Thus, the database 130 is a tag database having tags 135. Each tag 135 is an image of an object 136. The tag database 130 typically resides on the user equipment 10, but may also reside on, e.g., a server 140, connectable via wired or wireless network(s) 150. In the example of FIG. 1B, the network 150 is a wireless network connectable to the user equipment 10 through wireless links 151, 152.

In an exemplary embodiment, the program 110 has program code that modifies values of image data in image 120 to create a modified image 125. The adjustment is made to map a color characteristic of the color component (such as red, green blue components) of the user equipment to a corresponding color characteristic of a reference device. The color characteristics and color components of the reference device are known. The modified image 125 is then compared with tags 135 in the tag database 130, with the ultimate goal being to match object 121 with an object 136. In certain exemplary embodiments, the color characteristic could be one or more of white balance, contrast, or saturation, although other color characteristics may be used.

Figure 2:
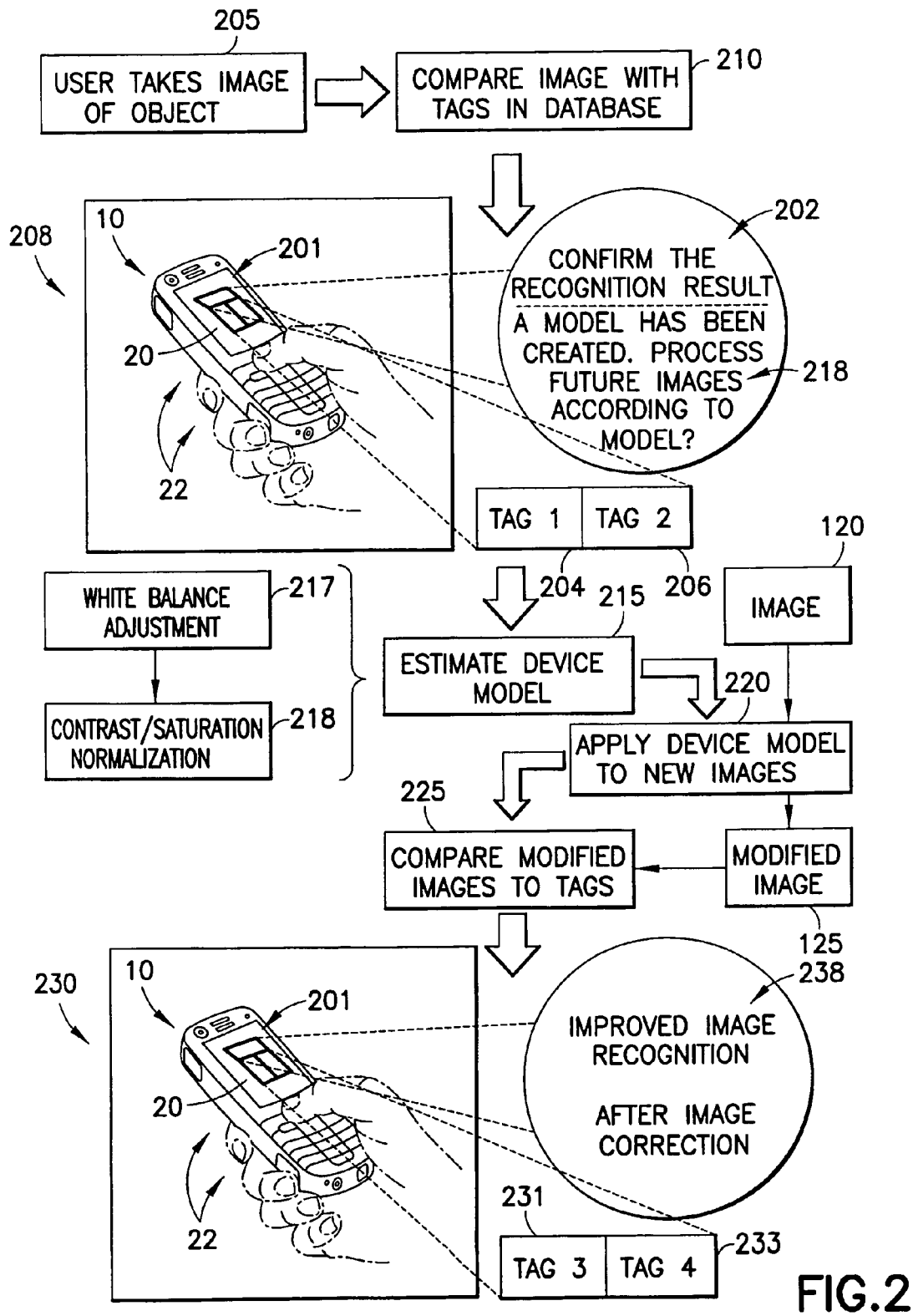
FIG. 2 is a block diagram of actions taken in an exemplary embodiment of the invention, and includes an example of a user interface used for training.

Referring now to FIG. 2 (with appropriate reference to FIG. 1), a block diagram is shown of actions taken in an exemplary embodiment of the invention. This block diagram includes an example of a user interface used for training. In the example of FIG. 2, it will be assumed that memories 100 (see FIG. 1) have computer program code (e.g., program 110), and the memories 100 and the computer program code are configured, with the processor 72 (and/or other processors shown in FIG. 1), to cause user equipment 10 to perform the actions shown in the following figures. For simplicity, it is assumed that a processor is configured to perform these actions.

In block 205, a user takes an image 120 of an object. In block 210, the processor is configured to cause a comparison between the user-taken image 120 and tags 135. In block 208, a user equipment 10 is shown being operated by a user. The user is using the user interface 22. Part of user interface 22 includes the displayed interface 201, which shows a confirmation dialog 202 and two tags 204, 206. The confirmation dialog 202 asks the user to confirm the recognition result, as embodied in one of the two tags 204 and 206. The user would select the appropriate tag 204, 206, then highlight and select the confirmation dialog 202. Not shown is that the user might not confirm the recognition result, and, e.g., be presented with another two tags 204, 206. It is noted that the recognition result means the object 121 matches an object 136.

In block 215, a device model is estimated. The device model is determined such that applying the device model to image data from an image 120 adjusts one or more color characteristics of one or more color components of an image 120 to map the one or more color components to corresponding color characteristics for those color components of a reference device. Block 215 is described in more detail below, but can include white balance adjustment (block 217), and adaptive dynamic range adjustment (block 218). Each of blocks 217 and 218 defines part of a transformation (described in more detail below). Block 215 uses the user-taken image 120 and the selected tag 204 (or tag 206), along with known color characteristics about the device that took the tag 204 (or 206), as is described in more detail below.

In an exemplary embodiment, the user is prompted via a dialog 218 on the displayed interface 201 to use the device model determined in block 215 when processing future images 120. It is assumed in the following description that the user responds affirmatively and therefore blocks 220, 225, and 230 are performed (blocks 220, 225, and 230 would not be performed if the user responds negatively in response to the dialog 218). It is noted that the text in dialog 218 and the location of dialog 218 in the blocks of FIG. 2 are merely exemplary. For instance, the dialog 218 could be performed before block 215, and ask the user if a model should be created based on the confirmed result (e.g., and used in the future for other images 120). If the user responds negatively, block 215 (and subsequent blocks) would not be performed; if the user responds affirmatively, blocks 215, 220, 225, and 230 would be performed.

In block 220, the device model is applied to a new image 120 to create a modified image 125. In block 225, the modified image 125 is compared with tags 135 in tag database 130 to determine tags 231, 233 corresponding to objects 136 that are possible matches to the object 121 in the image 120. The tags 231, 233 are presented to the user in block 230, and the previous confirmation dialog 202 would also be shown in displayed interface 201. In this example, reference 238 illustrates that improved image recognition should occur after image correction through a device model. That is, the tags 231 and 233 should be closer to the image 120 and fewer (or no) iterations of presenting different tags 231 and 233 to the user should be performed, relative to if the device model is not applied to an image 120.

Thus, FIG. 2 shows a feature for a new interface (e.g., user interface 22 including displayed interface 201) to provide device-specific image processing for optimal image recognition. As shown, users are prompted to confirm the images they just captured. The images are then compared with the tags for the same objects in the visual search database (e.g., tag database 130). A device model is obtained and saved internally. The user can then choose to let the system process the images optimally according to the device model in the future.

Figure 3:
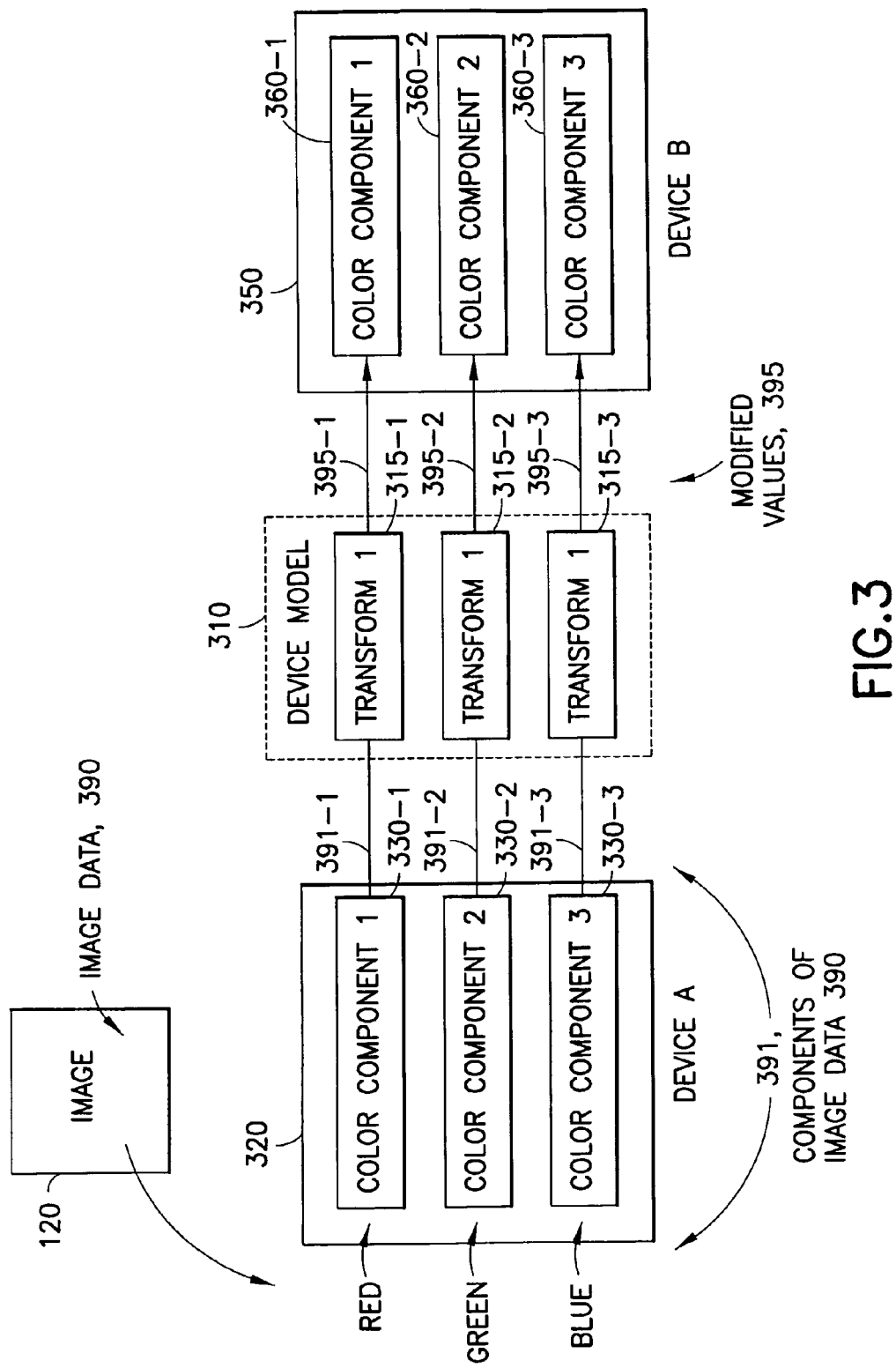
FIG. 3 is an illustration of using a device model to apply different transforms to color components.

FIG. 3 is an illustration of using a device model to apply different transforms to color components. In this example, a device model 310 is applied to color components 330-1, 330-2, and 330-3. Device A 320 has three different color components 330 in this example. The color components are typically red, green, and blue. In the example of FIG. 3, color component 330-1 corresponds to the color red, color component 330-2 corresponds to the color green, and color component 330-3 corresponds to the color blue. Each pixel (e.g., in camera 28) is a triad of red, green, blue. Each of the red, green, or blue is generally assigned a number of levels, such as eight bits or 256 levels (from zero to 255). Zero indicates no color and 255 indicates maximum color. It is noted that these values and colors are merely exemplary.

The device model 310 includes a transform 315-1, 315-2, and 315-3 corresponding to each color component 330-1, 330-2, and 330-3, respectively. The Device B, which is typically a known reference device, also has color components 360-1, 360-2, and 360-3 that correspond to color components 330-1, 330-2, and 330-3. Thus, the "input" color components 330 are transformed to be the "output" color components 360. In an exemplary embodiment, the device model 310 is able to stretch or compress intervals (e.g., segments) of individual color components 330 (see FIG. 4 and associated text). This creates a white balancing that can vary according to pixel density values.

It is noted that each color component and the color characteristics (such as white balance, contrast, and/or saturation) define a color space for a device. In one sense, the device model 310 maps from the color space 320 of Device A to the color space of Device B 350 (usually, a reference device having known color components and known color characteristics). The color components and associated color characteristics are defined by the device, e.g., by the camera 28 and by whatever video processing is performed (e.g., by the image/video processor 44).

FIG. 3 also shows an image 120 having image data 390 that is separated into components 391-1, 391-2, and 391-3 (in this case, red, green, and blue components, respectively). The values corresponding to these components 391 are transformed via transforms 315 into modified values 395-1, 395-2, and 395-3. The modified values 395 have color characteristics (e.g., white balance, contrast, and/or saturation) that are similar after mapping through a transform 315 to the color characteristics of the reference device (Device B in this example). The transforms 315 map the color characteristics of the color components 330 to the color characteristics of the color components 360. It is noted that the image data 390 may be pixel data (e.g., three values for each pixel in an image 120), compressed data, or other types of image data.

Figure 4:
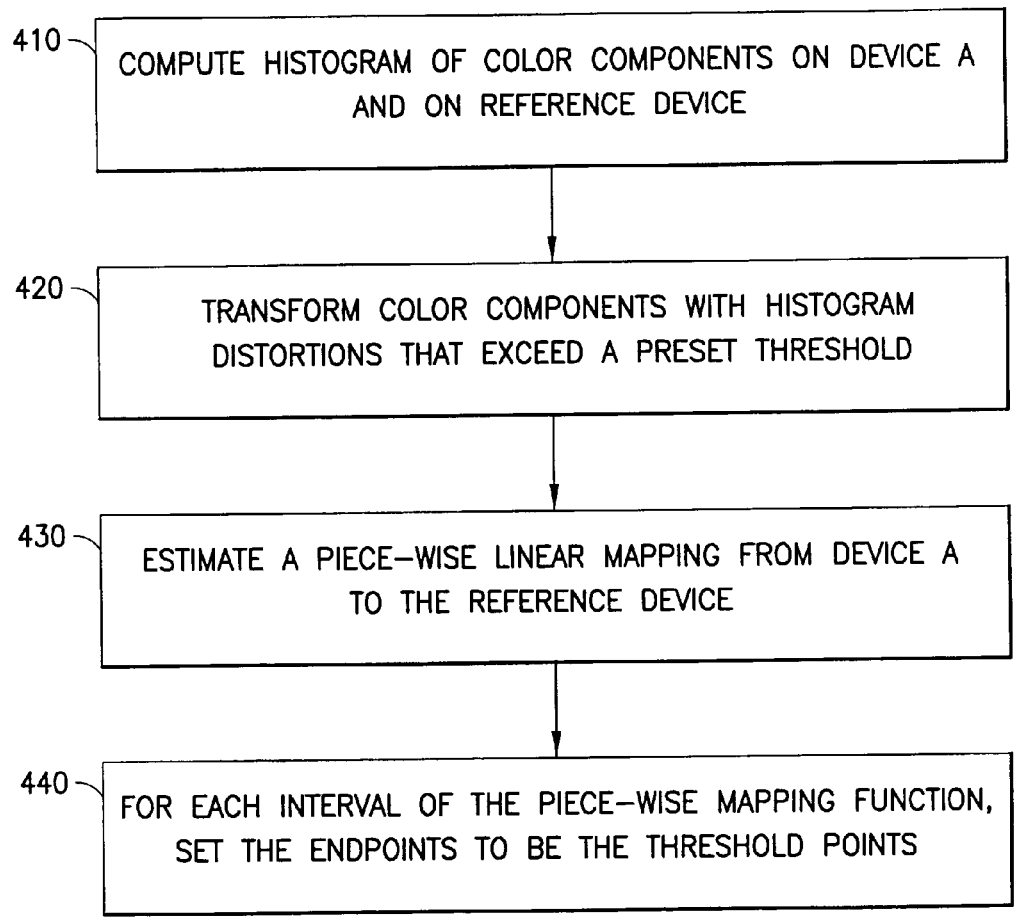
FIG. 4 is a block diagram of actions taken for white balancing.
Figure 5A:
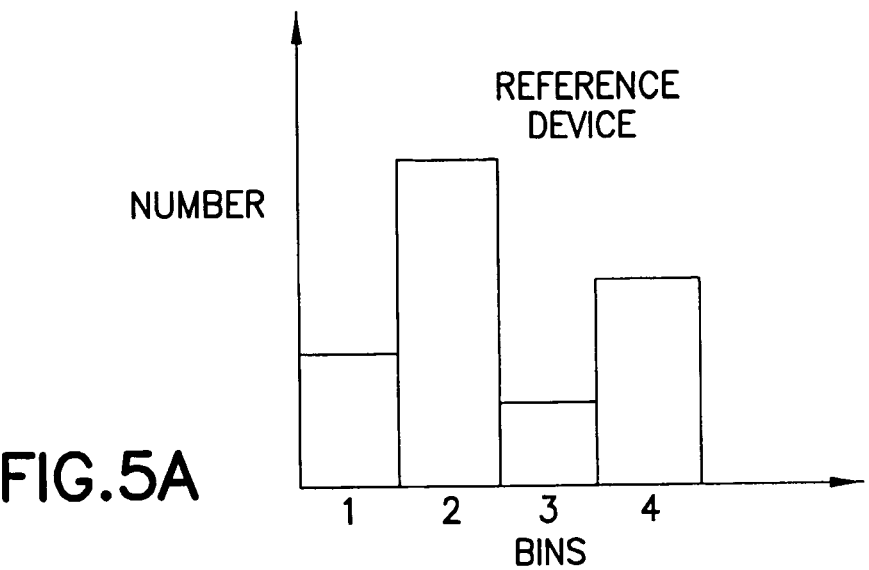
FIG. 5A is an exemplary histogram of a color component for a reference device.
Figure 5B:
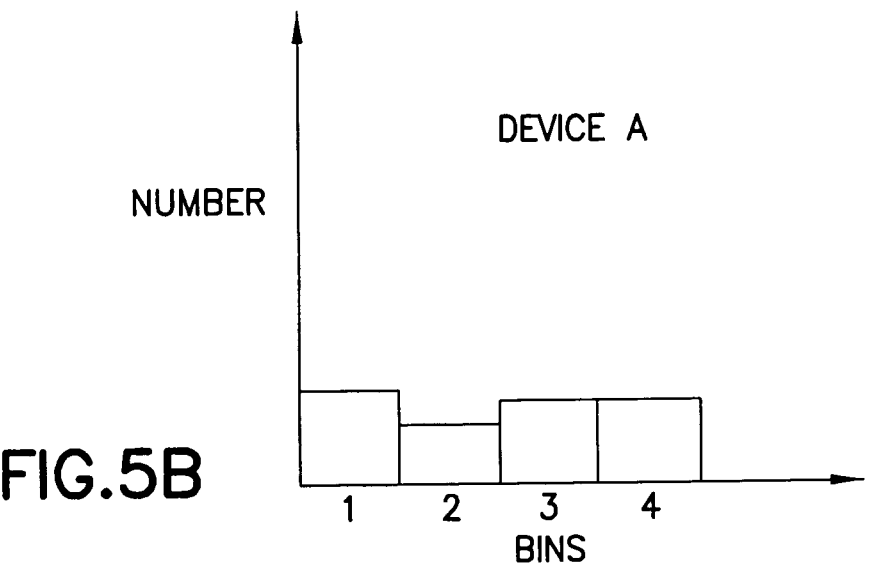
FIG. 5B is an exemplary histogram of a color component for a Device A (e.g., a user equipment used by a user)

Referring to FIG. 4 (with appropriate reference to preceding figures), a block diagram is shown of actions taken for white balancing. In block 410, histograms are computed of color components on Device A (the user equipment 10 being used by a user for image comparison) and the reference device (the device that takes the images stored as tags 135). To determine the histograms, divide the dynamic range evenly into intervals (e.g., bins) and then count the number of pixels with intensity belonging to each bin. This is shown in FIG. 5A, which is an exemplary histogram of a color component for a reference device, and in FIG. 5B, which is an exemplary histogram of a color component for a Device A. FIGS. 5A and 5B (and 5C) are shown as four bins for ease of description, but typically there would be more bins.

Figure 5C:
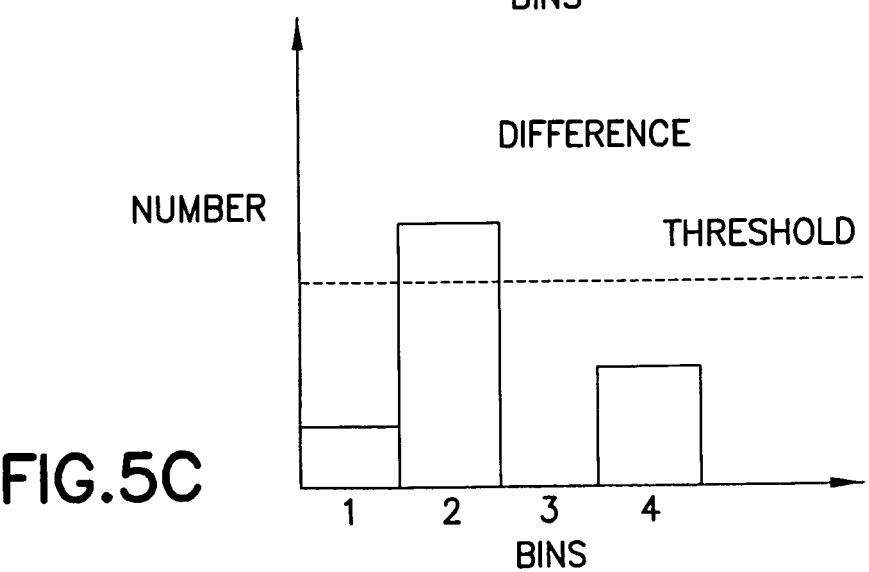
FIG. 5C is an exemplary histogram of differences between the histograms shown in FIGS. 5A and 5B.

In block 420, only (in an exemplary embodiment) the color components with histogram distortion exceeding a preset threshold are transformed, and the color components that do not exceed a present threshold are ignored. FIG. 5C is an exemplary histogram of differences between the histograms shown in FIGS. 5A and 5B. Bin number two in FIG. 5C has a difference value above a threshold. More specifically, the overall difference (for example, the sum of differences in each bin) will be compared to a threshold; if the overall difference is large enough, the entire color component will be transformed. It is noted that the bins with large differences have no direct relationship to the threshold points in FIG. 6. Typically, there are many fewer threshold points then the number of bins with large discrepancy. The threshold points are estimated so that the piece-wise transforms will optimally compensate for the histogram differences.

Figure 6:
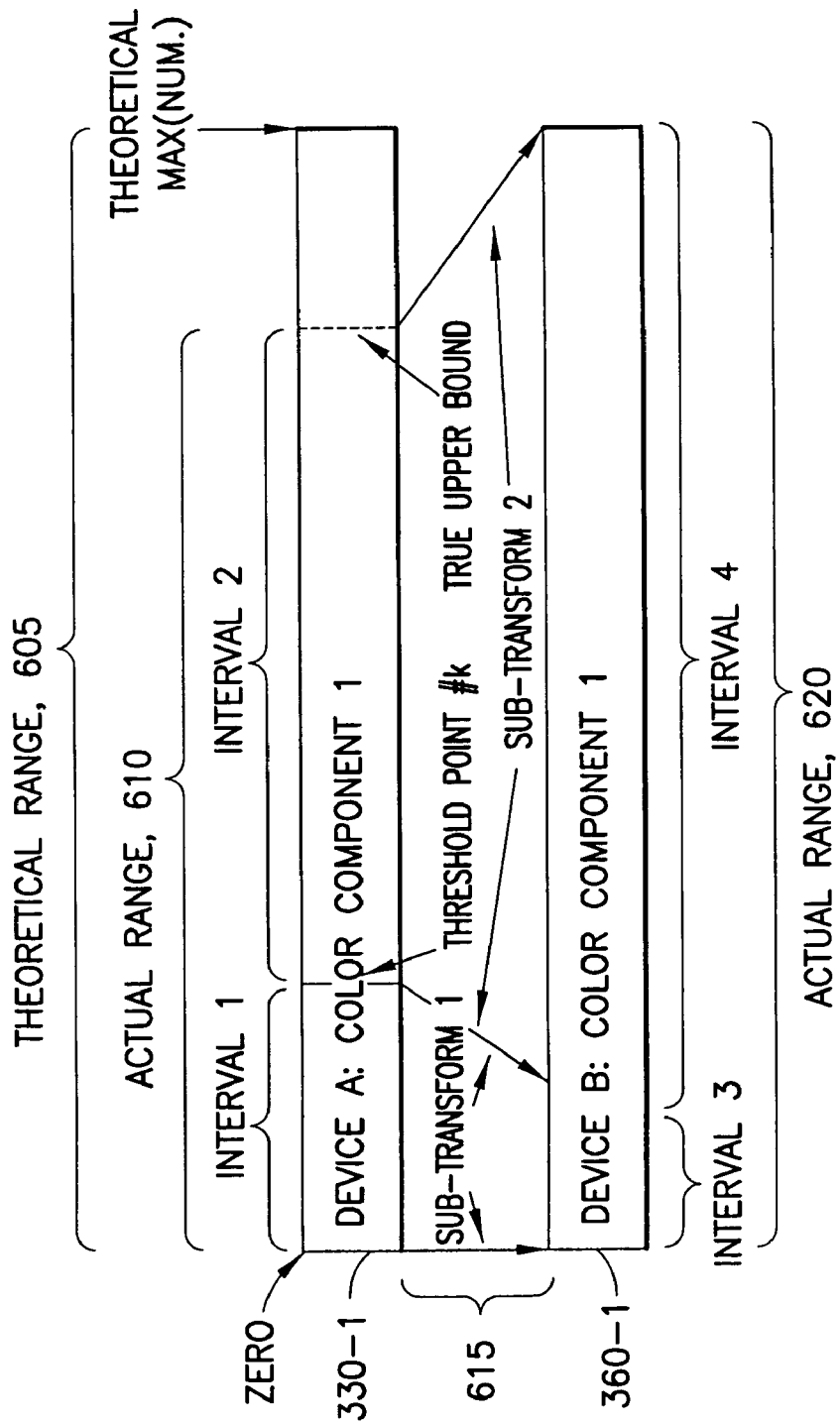
FIG. 6 is an illustration of using threshold points and true dynamic range to segment the color components and calculate color transforms for different devices.

In block 430, a piece-wise linear mapping of the color components being transformed is estimated from Device A to the reference device. In block 440, for each interval of the piece-wise mapping function, set the endpoints to be the threshold points. Refer to FIG. 6, which is an illustration of using threshold points and true dynamic range to segment the color components and calculate color transforms for different devices. The Device A color component (in this example, 330-1) has a theoretical dynamic range 605 from zero to a theoretical maximum (e.g., zero to 255). The interval 1 (one) is bounded by zero and the threshold point #k. The interval 2 (two) is bounded by the threshold point #k and the true upper bound, which is described in more detail below in an exemplary embodiment. In other exemplary embodiments, it is noted that the true upper bound can be set to a predetermined value or set to the theoretical maximum. A sub-transform 1 (one) is applied to the interval 1 (one) to map to an interval 3 (three) on Device B (e.g., a reference device). Similarly, sub-transform 2 (two) is applied to the interval 2 (two) to map to an interval 4 (four) on Device B (e.g., a reference device). The color component 330-1 has an actual range 610 from zero to a true upper bound and this actual range 610 is mapped to the actual range 620 of the color component 360-1 (in this example), using two sub-transforms (in this example). Reference 615 illustrates exemplary operations of a transform 315.

The threshold points (e.g., threshold point #k and the true upper bound) are used to segment the full dynamic range of a color component into segments, so that in each segment, the histogram of Device A will approximate the reference device. The positions of threshold points are usually placed around locations where there are the largest histogram distortions. More particularly, the threshold points are estimated so that the piece-wise transforms will optimally compensate for the histogram differences. That is, one estimates the threshold points so that the distortion of color in each range of the histogram will be compensated. Typically, one chooses two or three locations to segment the full range of the histogram, depending on how the color distortions are distributed.

Figure 7:
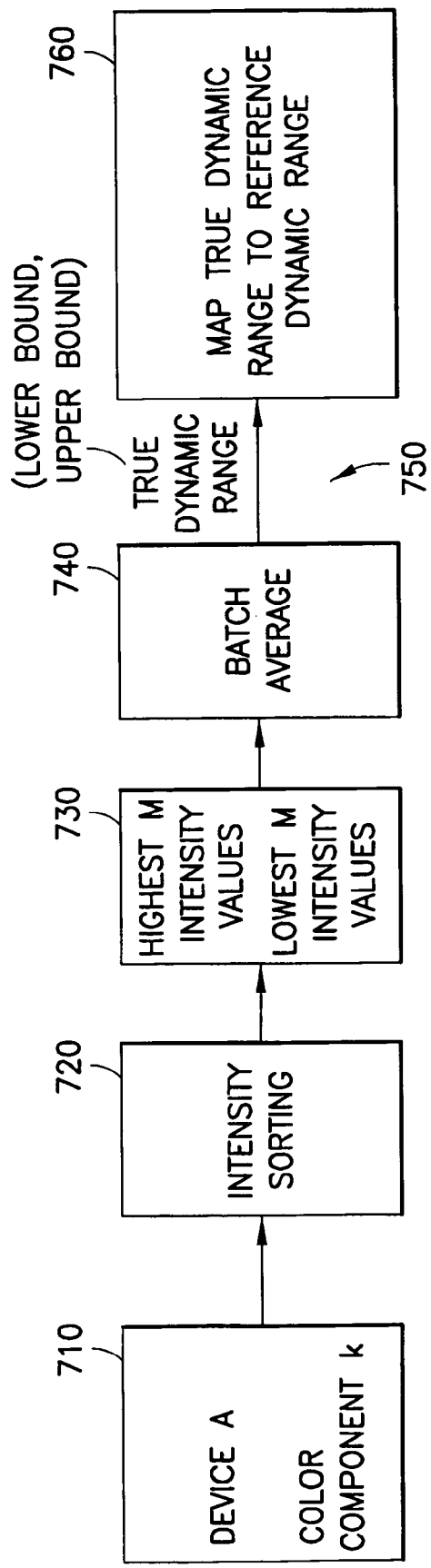
FIG. 7 illustrates a pipeline for determining true dynamic range of an image relative to a user equipment.

Turning to FIG. 7, this figure illustrates a pipeline for determining true dynamic range of an image relative to a mobile device. In block 710, the reference dynamic range of pixel intensity levels is defined. These levels include upper range and lower range level values. Usually the range is determined by two different ways: either by setting the range the same as the range from the reference device, or setting the range as the biggest dynamic range possible on Device A (for example, eight bits per channel means 0-255).

In block 720, the pixel values of the image are sorted. In block 730, the highest M and lowest M batch of intensity values are selected. A typical, non-limiting, value for M is one-fifth of the total number of pixels in the image. In block 740, the true upper and lower range values of the image are calculated by taking the average intensity of the highest M and lowest M batches of pixel intensities. This process avoids the influence of image noise on the true dynamic range. The output is the true dynamic range 750 of Device A. It is noted that in an exemplary embodiment, the true dynamic range 750 is the same as the actual range 610 shown in FIG. 6. That is, the true upper bound of FIG. 6 is set as the largest value (the "upper bound") for the true dynamic range 750. It is further noted that FIG. 6 assumes the range for the exemplary color component 330-1 starts at zero. However, the true dynamic range 750 may also have a non-zero lower bound (shown in FIG. 7 as "lower bound") and the value for the lower bound may be used in FIG. 6 instead of zero.

In block 760, the mapping of true dynamic range 750 to the reference dynamic range (e.g. actual range 620 in FIG. 6) is determined, using a piece-wise transform (e.g., and taking into account the white balance factors described above in reference to FIG. 4). The factors include the threshold points that decide the intervals and a linear factor that either compresses or stretches a corresponding interval to match Device A to the reference device. It is noted that it is also possible to have linear factor of one, which leave the range of interval unchanged, but typically the end points of the interval will be moved within the full range of the histogram. The process uses a true dynamic range 750 that can be applied to the color components of Device A, e.g., through a transform 315 and/or as a true upper bound as shown in FIG. 6. For instance, the true dynamic range 750 can be used to stretch or compress (or leave the same) the actual range 610 of the color component to match the actual range 620 of the color component for the reference device (Device B in FIG. 6).

Without in any way limiting the scope, interpretation, or application of the claims appearing below, a technical effect of one or more of the example embodiments disclosed herein includes mapping image data from one color space defined by one device into a color space defined by another device. Another technical effect of one or more of the example embodiments disclosed herein is adjusting one or more color characteristics of one or more color components to be closer to corresponding one or more color characteristics of a reference device, the modifying creating a modified image.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the computer program code for use by or in connection with an instruction execution system, apparatus, or device, such as a computer.

It is noted that the embodiments may also be performed by means. For instance, an apparatus could comprises a means for modifying values of image data of a first image of an object, the first image taken by a user using the apparatus, the modifying performed to map at least one color characteristic of at least one color component of the apparatus to a corresponding at least one color characteristic for the at least one color component of a reference device, the modifying creating a modified image; and a means for performing comparisons between the modified image and a plurality of second images of objects taken by the reference device.

Additionally, the embodiments may be implemented in a computer program. More specifically, a computer program may comprise code for code for modifying values of image data of a first image of an object, the first image taken by a user using a user equipment, the modifying performed to map at least one color characteristic of at least one color component of the user equipment to a corresponding at least one color characteristic for the at least one color component of a reference device, the modifying creating a modified image; and code for performing comparisons between the modified image and a plurality of second images of objects taken by the reference device, when the computer program is run on a processor.

In another exemplary embodiment, the computer program according to the previous paragraph is a computer program product comprising a computer-readable medium bearing computer program code embodied therein for use with the user equipment.

In a further exemplary embodiment, an apparatus includes at least one processor; and at least one memory including computer program code. The at least one memory and the computer program code configured to, with the at least one processor, cause the apparatus to perform at least the following: modifying values of image data of a first image of an object, the first image taken by a user using the apparatus, the modifying performed to map at least one color characteristic of at least one color component of the apparatus to a corresponding at least one color characteristic for the at least one color component of a reference device, the modifying creating a modified image; and performing comparisons between the modified image and a plurality of second images of objects taken by the reference device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    modifying values of image data of a first image of an object using a processor, the first image taken by a user using a user equipment, the modifying performed to map at least one color characteristic of at least one color component of the user equipment to a corresponding at least one color characteristic for the at least one color component of a reference device, the modifying creating a modified image; and
    on the user equipment, performing comparisons between the modified image and a plurality of second images of objects taken by the reference device.

2. The method of claim 1, wherein performing comparisons further comprises:
    selecting an image for presentation to the user based on the comparisons; and
    allowing the user to confirm if the presented image is an image of the object in the first image.

3. The method of claim 2, further comprising, in response to the user confirming the presented image is an image of the object in the first image, presenting information related to the object to the user.

4. The method of claim 2:
    further comprising, in response to the user confirming that the presented image is an image of the object in the first image, creating a transformation that maps the at least one color characteristic of the at least one color component of the first image to a corresponding the at least one color characteristic for the at least one color component of the reference device; and
    wherein modifying values further comprises applying the transformation to the values of the image data corresponding to the at least one color component.

5. The method of claim 1, wherein modifying further comprises applying a mapping to the values, the mapping converting white balance of the at least one color component of the user equipment to a corresponding white balance for the at least one color component of the reference device.

6. The method of claim 5, wherein the mapping is a first mapping and modifying further comprises applying a second mapping to the values, the second mapping converting contrast, saturation, or both contrast and saturation of the at least one color component of the user equipment to a corresponding contrast, saturation, or both contrast and saturation for the at least one color component of the reference device.

7. The method of claim 1, wherein each value of image data has a component corresponding to each of the at least one color components, and wherein there are three color components: one color component for red, one color component for blue, and one color component for green.

8. The method of claim 1:
further comprising creating a transformation that maps the at least one color characteristic of the at least one color component of the user equipment to a corresponding at least one color characteristic for the at least one color component of the reference device; and
wherein modifying values further comprises applying the transformation to the values of the image data corresponding to the at least one color component.

9. The method of claim 8, wherein creating a transformation further comprises for each of the at least one color components:
computing a histogram for the color component on the user equipment and on the reference device;
transforming the color component of the user equipment if histogram distortion exceeds a preset threshold;
determining a piece-wise linear mapping of the color component for the user equipment being transformed, the piece-wise linear mapping converting color component values of the user equipment to color component values of the reference device; and
for each interval of the piece-wise mapping function, setting endpoint of the interval to be the threshold points.

10. The method of claim 9, wherein creating a transformation further comprises, for each of the at least one color components on the user equipment:
defining a reference dynamic range of pixel intensity values;
sorting pixel intensity values in the first image;
selecting the highest M values and the lowest M values;
averaging the highest M values;
averaging the lowest M values;
determining a true dynamic range based on the averages;
calculating, using a piece-wise transform, a mapping of the true dynamic range to a reference dynamic range of the reference device.

11. The method of claim 10, wherein each of the true dynamic ranges is used for corresponding at least one color components when transforming the corresponding at least one color components of the user equipment if histogram distortion exceeds a preset threshold.

12. An apparatus comprising:
at least one processor configured to cause the apparatus to perform at least the following:
modifying values of image data of a first image of an object, the first image taken by a user using the apparatus, the modifying performed to map at least one color characteristic of at least one color component of the apparatus to a corresponding at least one color characteristic for the at least one color component of a reference device, the modifying creating a modified image; and
performing comparisons between the modified image and a plurality of second images of objects taken by the reference device.

13. The apparatus of claim 12, wherein performing comparisons further comprises:
selecting an image for presentation to the user based on the comparisons; and
allowing the user to confirm if the presented image is an image of the object in the first image.

14. The apparatus of claim 13:
wherein the at least one processor is further configured to cause the apparatus to perform, in response to the user confirming that the presented image is an image of the object in the first image, creating a transformation that maps the at least one color characteristic of the at least one color component of the first image to a corresponding the at least one color characteristic for the at least one color component of the reference device; and
wherein modifying values further comprises applying the transformation to the values of the image data corresponding to the at least one color component.

15. The apparatus of claim 12, wherein modifying further comprises applying a mapping to the values, the mapping converting white balance of the at least one color component of the apparatus to a corresponding white balance for the at least one color component of the reference device.

16. The apparatus of claim 15, wherein the mapping is a first mapping and modifying further comprises applying a second mapping to the values, the second mapping converting contrast, saturation, or both contrast and saturation of the at least one color component of the apparatus to a corresponding contrast, saturation, or both contrast and saturation for the at least one color component of the reference device.

17. The apparatus of claim 12, wherein each value of image data has a component corresponding to each of the at least one color components, and wherein there are three color components: one color component for red, one color component for blue, and one color component for green.

18. The apparatus of claim 12:
wherein the at least one processor is further configured to cause the apparatus to perform creating a transformation that maps the at least one color characteristic of the at least one color component of the apparatus to a corresponding at least one color characteristic for the at least one color component of the reference device; and
wherein modifying values further comprises applying the transformation to the values of the image data corresponding to the at least one color component.

19. The apparatus of claim 12, further comprising at least one memory comprising computer program code, the at least one memory and the computer program code configured to, with the at least one processor, cause the apparatus to perform the modifying the values and the performing the comparisons.

20. A computer program product comprising a computer-readable storage medium bearing computer program code embodied therein fox use with, an apparatus, the computer program code comprising:
code for modifying values of image data of a first image of an object, the first image taken by a user using the apparatus, the modifying performed to map at least one color characteristic of at least one color component of the apparatus to a corresponding at least one color characteristic for the at least one color component of a reference device, the modifying creating a modified image; and
code for performing comparisons between the modified image and a plurality of second images of objects taken by the reference device.

* * * * *

UNITED STATES PATENT AND TRADEMARK OFFICE
CERTIFICATE OF CORRECTION

PATENT NO. : 8,369,617 B2
APPLICATION NO. : 12/758297
DATED : February 5, 2013
INVENTOR(S) : Bamidele et al.

Page 1 of 1

It is certified that error appears in the above-identified patent and that said Letters Patent is hereby corrected as shown below:

In the Claims

Claim 9, col. 11, line 31 delete "endpoint" and insert --endpoints--.

Claim 20, col. 12, line 52 delete "fox" and insert --for--.

Signed and Sealed this
Seventh Day of May, 2013

Teresa Stanek Rea
*Acting Director of the United States Patent and Trademark Office*